(12) United States Patent
Balaraman et al.

(10) Patent No.: US 12,639,966 B2
(45) Date of Patent: May 26, 2026

(54) METHOD AND SYSTEM OF PERFORMING DOMAIN-BASED ERROR CORRECTION AFTER OPTICAL CHARACTER RECOGNITION

(71) Applicant: L&T TECHNOLOGY SERVICES LIMITED, Chennai (IN)

(72) Inventors: Mridul Balaraman, Bangalore (IN); Madhusudan Singh, Bangalore (IN); Ashwin Kanth, Bangalore (IN); Pinak Pani Gogoi, Bangalore (IN); Sakshi Singh, Benares (IN)

(73) Assignee: L&T TECHNOLOGY SERVICES LIMITED, Chennai (IN)

( * ) Notice: Subject to any disclaimer, the term of this patent is extended or adjusted under 35 U.S.C. 154(b) by 308 days.

(21) Appl. No.: 18/434,892

(22) Filed: Feb. 7, 2024

(65) Prior Publication Data

US 2024/0420493 A1 Dec. 19, 2024

(30) Foreign Application Priority Data

Jun. 16, 2023 (IN) ............................ 202341041053

(51) Int. Cl.
*G06V 30/12* (2022.01)
*G06F 40/279* (2020.01)
(Continued)

(52) U.S. Cl.
CPC ............ *G06V 30/12* (2022.01); *G06F 40/279* (2020.01); *G06V 10/82* (2022.01); *G06V 30/245* (2022.01)

(58) Field of Classification Search
CPC .. G06V 30/10; G06V 30/12; G06V 30/19173; G06V 30/245; G06V 30/274; G06V 10/82; G06F 40/279
See application file for complete search history.

(56) References Cited

U.S. PATENT DOCUMENTS 5,418,864 A * 5/1995 Murdock .............. G06F 18/254 382/229
7,664,343 B2 * 2/2010 Withum .................. G06F 18/22 382/231
(Continued)

OTHER PUBLICATIONS

Sara Salimzadeh; Improving OCR Quality by Post-Correction; Universiteit van Amsterdam; Jul. 12, 2019.
(Continued)

*Primary Examiner* — Scott A Rogers
(74) *Attorney, Agent, or Firm* — Kendal M. Sheets

(57) ABSTRACT

A method and system for performing optical character recognition (OCR) error correction is disclosed. The method includes receiving at least one document image. One or more text entities are determined in the data using an OCR technique. A character embedding, a layout embedding, and a style embedding is determined of each of the one or more text entities in the at least one document image. A concatenated embedding is determined of each of the one or more text entities based on the corresponding character embedding, style embedding, and layout embedding of each of the one or more text entities. A corrected character embedding of each character recognized in the corresponding text entity based on the corresponding concatenated embedding using an encoder-decoder model.

12 Claims, 8 Drawing Sheets

200

Domain-based OCR Error Correction Device 102
Optical Character Recognition (OCR) Module 202
Character Embedding Extraction Module 204
Style Information Extraction Module 206
Layout Extraction Module 208
Concatenation Module 210
Encoder-Decoder DL Module 212
Domain Dictionary 214

(51) Int. Cl.
*G06V 10/82* (2022.01)
*G06V 30/244* (2022.01)

(56) References Cited

U.S. PATENT DOCUMENTS

| | | | | |
|---|---|---|---|---|
| 8,452,099 | B2 * | 5/2013 | Reddy | G06F 18/28 382/187 |
| 11,481,605 | B2 * | 10/2022 | Nguyen | G06N 3/044 |
| 11,842,524 | B2 * | 12/2023 | Desai | G06V 10/98 |
| 11,954,139 | B2 * | 4/2024 | Paruchuri | G06N 3/08 |
| 12,008,331 | B2 * | 6/2024 | Luan | G06F 40/40 |
| 12,505,688 | B2 * | 12/2025 | Jha | G06V 30/19147 |

OTHER PUBLICATIONS

Kris Cao, Marek Rei; A Joint Model for Word Embedding and Word Morphology; Proceedings of the 1st Workshop on Representation Learning for NLP, pp. 18-26, University of Cambridge, Berlin, Germany; Aug. 11, 2016.

Christian Bartz; Reducing the Annotation Burden: Deep Learning for Optical Character Recognition using less Manual Annotations;HPI; Jul. 28, 2012.

Nikita Srivatsan, Jonathan T. Barron, Dan Klein, Taylor Berg-Kirkpatrick; A Deep Factorization of Style and Structure in Fonts; Nov. 2019.

Ahmed Hamdi, Elvys Linhares Pontes, Nicolas Sidère, Mickael Coustaty, Antoine Doucet; In-Depth Analysis of the Impact of OCR Errors on Named Entity Recognition and Linking; Natural Language Engineering, 2022, 29 (2), pp. 425-448.

Rui Dong, David Smith; Multi-Input Attention for Unsupervised OCR Correction; College of Computer Information and Science, Northeastern University, Jul. 2018.

Kengtao Zheng , Nankai Lin Shengyi Jiang; Unsupervised Character Embedding Correction and Candidate Word Denoising; IEEE/ACM Transactions on Audio, Speech, and Language Processing, vol. 30, 2022.

* cited by examiner

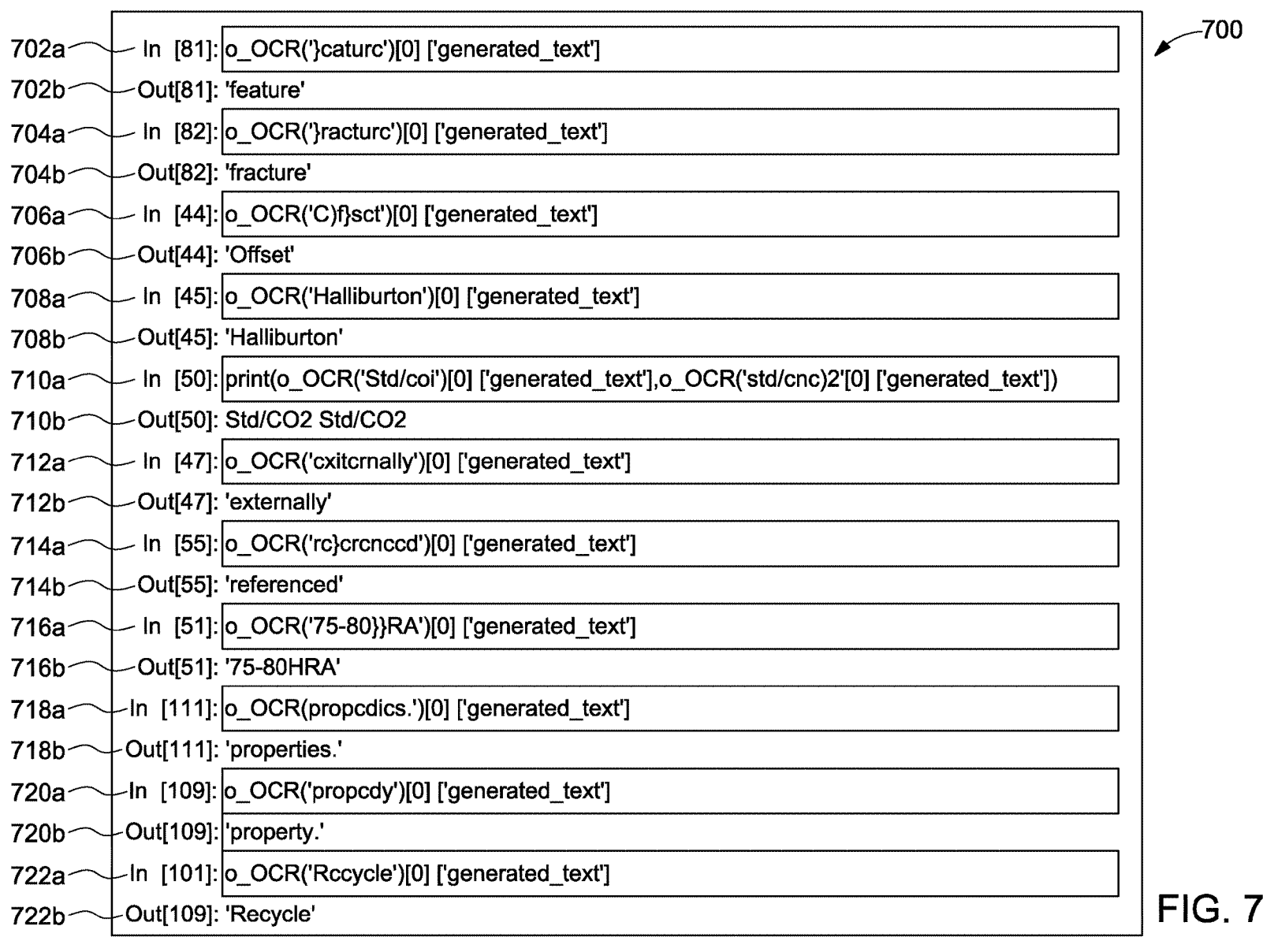

700

702a In [81]: o_OCR('}caturc')[0] ['generated_text']
702b Out[81]: 'feature'
704a In [82]: o_OCR('}racturc')[0] ['generated_text']
704b Out[82]: 'fracture'
706a In [44]: o_OCR('C)f}sct')[0] ['generated_text']
706b Out[44]: 'Offset'
708a In [45]: o_OCR('Halliburton')[0] ['generated_text']
708b Out[45]: 'Halliburton'
710a In [50]: print(o_OCR('Std/coi')[0] ['generated_text'],o_OCR('std/cnc)2'[0] ['generated_text'])
710b Out[50]: Std/CO2 Std/CO2
712a In [47]: o_OCR('cxitcrnally')[0] ['generated_text']
712b Out[47]: 'externally'
714a In [55]: o_OCR('rc}crcnccd')[0] ['generated_text']
714b Out[55]: 'referenced'
716a In [51]: o_OCR('75-80}}RA')[0] ['generated_text']
716b Out[51]: '75-80HRA'
718a In [111]: o_OCR(propcdics.')[0] ['generated_text']
718b Out[111]: 'properties.'
720a In [109]: o_OCR('propcdy')[0] ['generated_text']
720b Out[109]: 'property.'
722a In [101]: o_OCR('Rccycle')[0] ['generated_text']
722b Out[109]: 'Recycle'

FIG. 7

METHOD AND SYSTEM OF PERFORMING DOMAIN-BASED ERROR CORRECTION AFTER OPTICAL CHARACTER RECOGNITION

TECHNICAL FIELD

This disclosure relates generally to image processing, and more particularly to a method and a system of performing optical character recognition.

BACKGROUND

Text extraction techniques for example, Optical Character Recognition (OCR) may allow extraction of text data from documents, such as an image or a Portable Document Format (PDF) file. Since, OCR works by identifying text in a document by character by character as well as considering contextual information of each word. The recognition in most cases is error prone due to several reasons like poor quality of document or handwritten document etc. The type of OCR errors is not only limited to spelling mistakes but also word breaks and joining etc. are very prevalent. Documents which are specific to technical domains like engineering and medical contain abundance of exclusive words or alphanumeric which are difficult to correct by general language based spell-check methods available.

Therefore, there is a requirement for a text correction technique which extracts correct textual information from documents ensuring the correctness of data after performing OCR.

SUMMARY OF THE INVENTION

In an embodiment, a method of performing domain-based optical character recognition (OCR) error correction is disclosed. The method may include, receiving by a processor, at least one document image. In an embodiment, the at least one document image may comprise data corresponding to at least one domain. The processor may further determine one or more text entities in the data using an optical character recognition (OCR) technique. In an embodiment, the one or more text entities may be determined based on recognition of each character of each of the one or more text entities. The processor may further determine a character embedding indicative of each character recognized in a corresponding text entity from each of the one or more text entities based on at least one library. The processor may further determine a style embedding indicative of text characteristic information of each character recognized in the corresponding text entity from each of the one or more text entities. The processor may further determine a layout embedding of each of the one or more text entities indicative of a layout hierarchy information of each of the one or more text entities in the at least one document image. The processor may further determine a concatenated embedding of each of the one or more text entities based on the corresponding character embedding, style embedding and document layout embedding of each of the one or more text entities. The processor may further determine a corrected character embedding of each character recognized in the corresponding text entity for each of the one or more text entities based on the corresponding concatenated embedding using an encoder-decoder model. In an embodiment, the encoder-decoder model may be trained to recognize data corresponding to the at least one domain.

In another embodiment, a system of performing domain-based optical character recognition (OCR) error correction is disclosed. The system may include a processor, a memory communicably coupled to the processor, wherein the memory may store processor-executable instructions, which when executed by the processor-executable instructions, may cause the processor to receive at least one document image. In an embodiment, the at least one document image may comprise data corresponding to at least one domain. The processor may further determine one or more text entities in the data using an optical character recognition (OCR) technique. In an embodiment, the one or more text entities may be determined based on recognition of each character of each of the one or more text entities. The processor may further determine a character embedding indicative of each character recognized in a corresponding text entity from each of the one or more text entities based on at least one library. The processor may further determine a style embedding indicative of text characteristic information of each character recognized in the corresponding text entity from each of the one or more text entities. The processor may further determine a layout embedding of each of the one or more text entities indicative of a layout hierarchy information of each of the one or more text entities in the at least one document image. The processor may further determine a concatenated embedding of each of the one or more text entities based on the corresponding character embedding, style embedding and document layout embedding of each of the one or more text entities. The processor may further determine a corrected character embedding of each character recognized in the corresponding text entity for each of the one or more text entities based on the corresponding concatenated embedding using an encoder-decoder model. In an embodiment, the encoder-decoder model may be trained to recognize data corresponding to the at least one domain.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 7 depicts a screenshot depicting exemplary output results obtained from the domain-based OCR error correction device, in accordance with an embodiment of the present disclosure.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered exemplary only, with the true scope being indicated by the following claims. Additional illustrative embodiments are listed.

Further, the phrases "in some embodiments", "in accordance with some embodiments", "in the embodiments shown", "in other embodiments", and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered exemplary only, with the true scope being indicated by the following claims.

Figure 1:
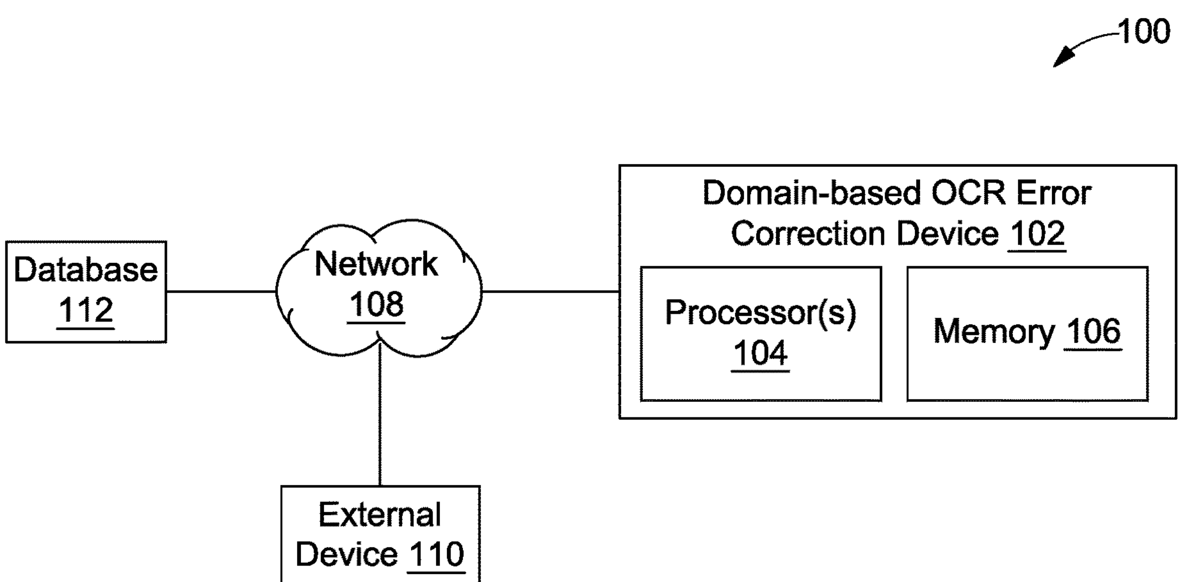
FIG. 1 illustrates a block diagram of an exemplary domain-based Optical Character Recognition (OCR) error correction system, in accordance with some embodiments of the present disclosure.

Referring now to FIG. 1, a block diagram of an exemplary domain-based Optical Character Recognition (OCR) error correction system 100, in accordance with some embodiments of the present disclosure. The domain-based OCR error correction system 100 may include a domain-based OCR error correction device 102, an external device 110, and a database 112 communicably coupled to each other through a wired or a wireless communication network 108. The domain-based OCR error correction device 102 may include a processor 104 and a memory 106. In an embodiment, examples of processor(s) 104 may include, but are not limited to, an Intel® Itanium® or Itanium 2 processor(s), or AMD® Opteron® or Athlon MP® processor(s), Motorola® lines of processors, Nvidia®, FortiSOC™ system on a chip processors or other future processors. The memory 106 may store instructions that, when executed by the processor 104, cause the processor 104 to perform domain-based OCR error correction, as discussed in greater detail below. The memory 106 may be a non-volatile memory or a volatile memory. Examples of non-volatile memory may include but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The database 112 may be enabled in a cloud or a physical database comprising one or more document images comprising text data. In an embodiment, the database 110 may store data inputted by an external device 110 or generated by the domain-based OCR error correction device 102.

In an embodiment, the communication network 108 may be a wired or a wireless network or a combination thereof. The network 108 can be implemented as one of the different types of networks, such as but not limited to, ethernet IP network, intranet, local area network (LAN), wide area network (WAN), the internet, Wi-Fi, LTE network, CDMA network, 5G, and the like. Further, network 108 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further network 108 can include a variety of network devices, including routers, bridges, servers, computing devices, storage devices, and the like.

In an embodiment, the domain-based OCR error correction device 102 may receive a request for performing OCR from the external device 110 through the network 108. In an embodiment, the external device 110 may be a computing system, including but not limited to, a smart phone, a laptop computer, a desktop computer, a notebook, a workstation, a portable computer, a personal digital assistant, a handheld, a scanner, or a mobile device. In an embodiment, the domain-based OCR error correction device 102 may be, but not limited to, in-built into the external device 110 or a stand-alone computing device.

By way of an example, the processor 104 may receive at least one document image. The at least one document image may comprise data corresponding to at least one domain such as chemistry, mathematics, etc. The processor 102 may further determine one or more text entities in the data using one or more known in the art optical character recognition (OCR) techniques. The one or more text entities may be determined based on recognition of each character of each of the one or more text entities and tokenization. The processor 102 may further determine character embeddings of each character recognized using the OCR techniques. In an embodiment, the character embeddings may be indicative of each character recognized in a corresponding text entity for each of the one or more text entities based on at least one dictionary corresponding to at least one language or domain such as English, French, Spanish, etc. In an embodiment, the character embeddings may represent vectors that capture the grammatical function (syntax) and the meaning (semantics) of the words or entities. The processor 104 may further determine a style embedding indicative of one or more text-characteristic information of each character for each of the one or more text entities recognized in the corresponding text entity. In an embodiment, the text-characteristic information for each of the text entities may include font information of each character of each of the text entities. In an embodiment, the font information may include font type, font size, case information, and typography information (bold, italicized, underlined, etc.). The processor 104 may further determine a layout embedding of each of the one or more text entities indicative of a layout hierarchy information of each of the one or more text entities in the at least one document image. In an embodiment, the processor may determine a region of interest in the document depicting layout hierarchy information. In an embodiment, the layout hierarchy information may include one or more of a plurality of hierarchy classifications such as but not limited to, a table, a header, a sub-header, a paragraph, and a graphical representation, etc.

The processor 104 may further determine concatenated embeddings of each of the one or more text entities based on the corresponding character embeddings, the style embeddings and the document layout embeddings of each of the one or more text entities. The concatenated embeddings of each of the one or more text entities may be determined by concatenating the corresponding character embedding, the style embedding, and the document layout embedding, respectively. The processor 104 may further determine a corrected character embedding of each character recognized for the corresponding text entity based on the corresponding concatenated embedding using an encoder-decoder model. The encoder-decoder model may be trained to recognize data corresponding to the at least one domain such as, but not limited to, chemistry, mathematics, finance, etc.

Figure 2:
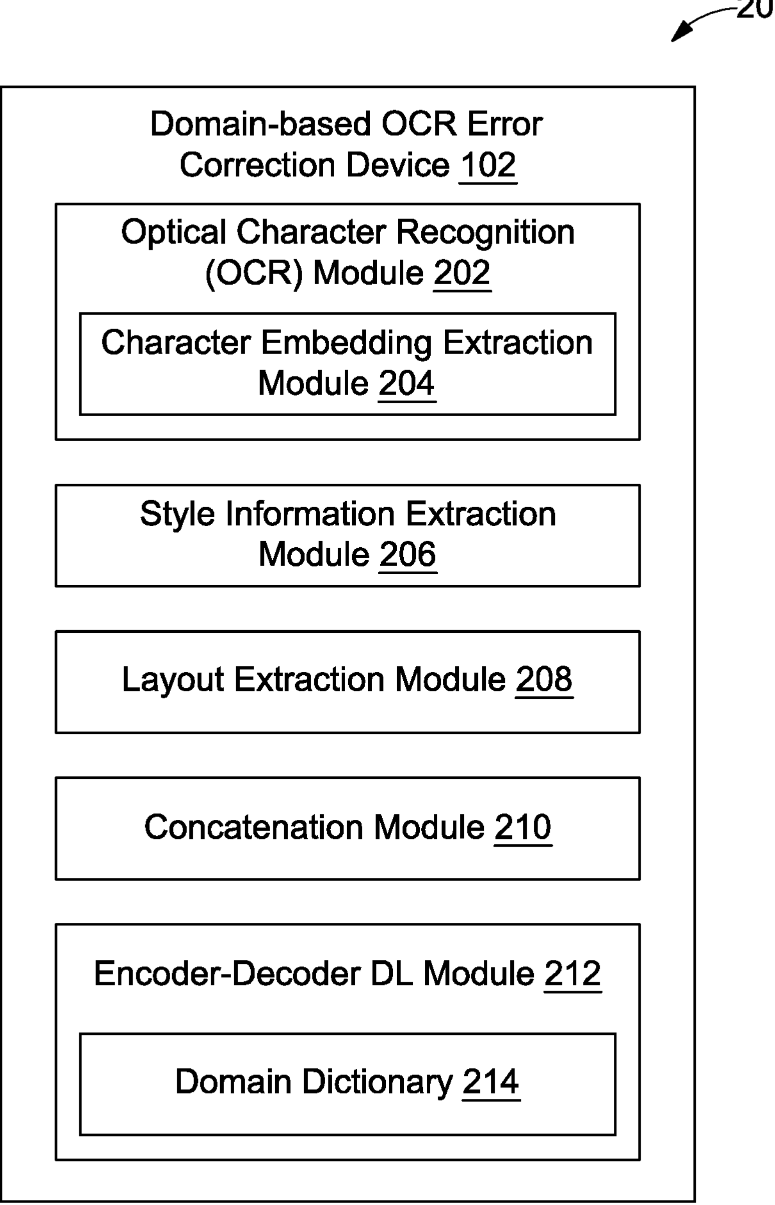
FIG. 2 is a functional block diagram of the domain-based OCR error correction device, in accordance with some embodiments of the present disclosure.

Referring now to FIG. 2, a functional block diagram of the correction device, in accordance with some embodiments of the present disclosure. In an embodiment, the domain-based OCR error correction device 102 may include an optical character recognition (OCR) module 202, a style information extraction module 206, a layout extraction module 208, a concatenation module 210 and an encoder-decoder DL module 212.

The OCR module 202 may receive at least one document image. The at least one document image comprises data corresponding to one or more technical domains such as, but not limited to, mathematical, chemical, finance, oil and gas, etc. The optical character recognition (OCR) module 202 may determine one or more text entities in the data using an OCR technique. The one or more text entities may be determined based on recognition of each character of each of the one or more text entities.

Figure 3:
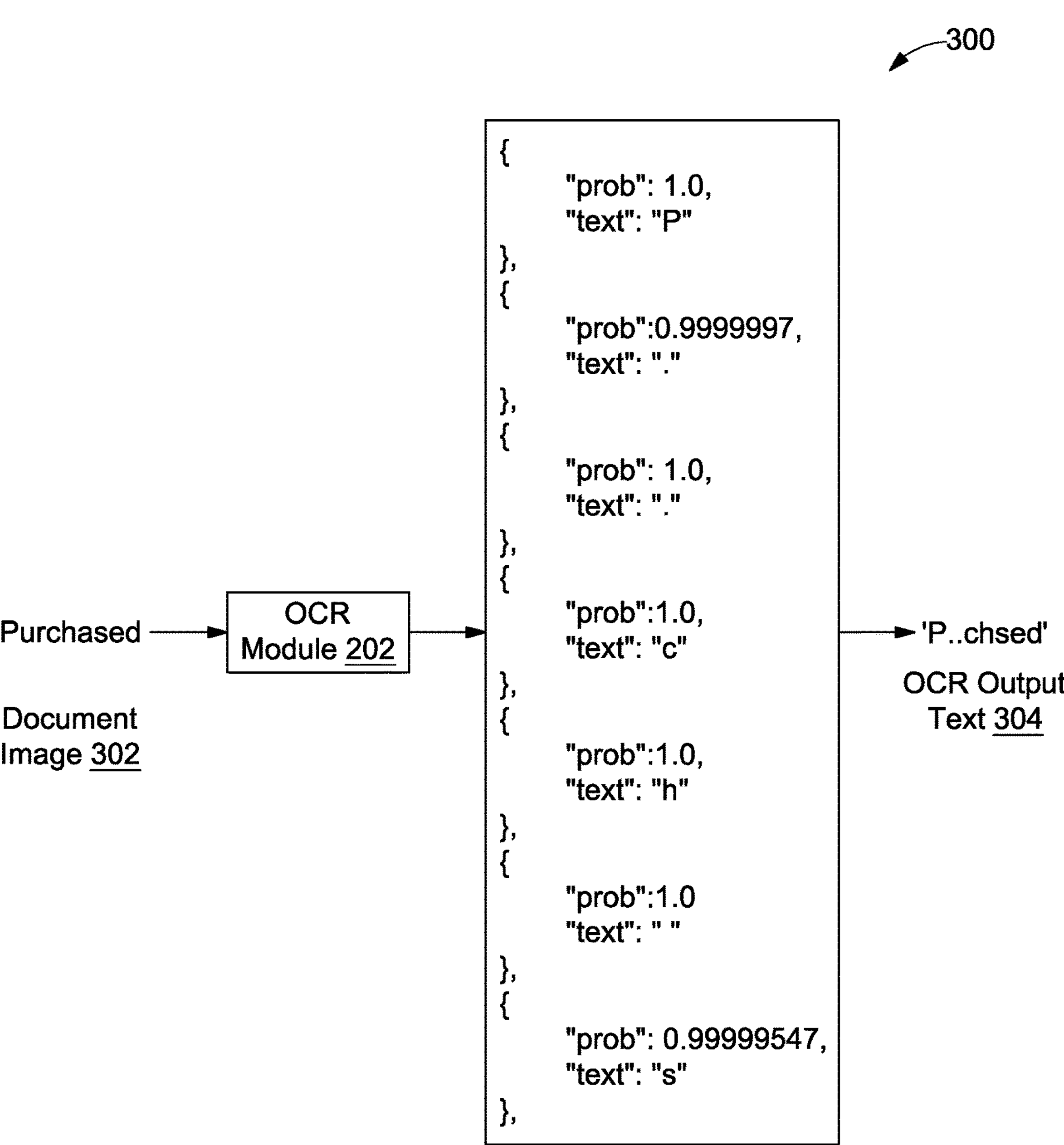
FIG. 3 depicts a block diagram of a conventional OCR module, in accordance with some embodiments of the present disclosure.

In an embodiment, the OCR module 202 may include a character embedding extraction module 204 that may determine character embeddings of each of the text entities indicative of each character recognized in a corresponding text entity based on at least one dictionary corresponding to a language such as, but not limited to, English, Spanish, etc. Referring now to FIG. 3, a block diagram 300 of a conventional OCR module 202 is illustrated, in accordance with some embodiments of the present disclosure. The OCR module 202 may be inputted with a document image 302. The document image 302 may include various text entities as data. In an exemplary embodiment, recognition of a text entity "Purchased" is depicted in FIG. 3. The OCR module 202 may determine the OCR output text 304 such as "P . . . chsed". The OCR output text 304 may be an error prone data due to incapability of the OCR module 202 to determine correct characters of the text entity "Purchased". The error may be due to poor document quality of document image 302.

Figure 4:
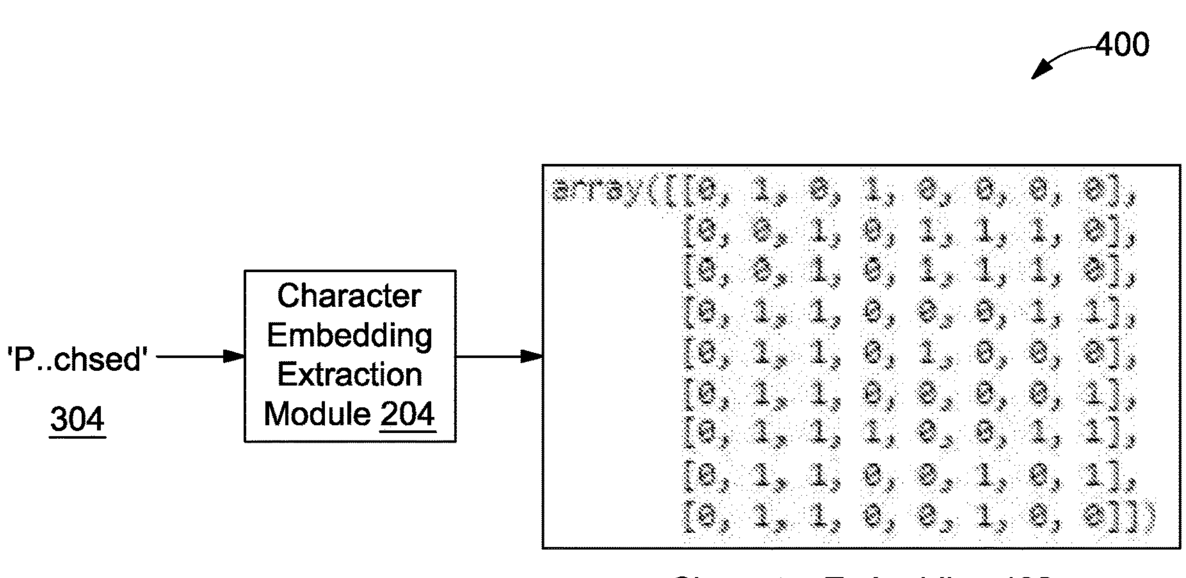
FIG. 4 depicts a block diagram for extraction of exemplary character embeddings, in accordance with an embodiment of the present disclosure.

Further, the OCR module 202 may include a character embedding extraction module 204 which may determine character embeddings of each character recognized using the OCR techniques by the OCR module 202. In an embodiment, the character embeddings may be indicative of each character recognized in a corresponding text entity for each of the one or more text entities based on at least one dictionary corresponding to at least one language or domain such as English, French, Spanish, etc. In an embodiment, the character embeddings may represent vectors that capture the grammatical function (syntax) and the meaning (semantics) of the words or entities. Referring now to FIG. 4, a block diagram 400 for extraction of exemplary character embeddings is illustrated, in accordance with an embodiment of the present disclosure. The block diagram 400 depicts the character embedding extraction module 204 receiving an input from the OCR module 202 as recognized characters of the text entity "P . . . chased" 304. The character embedding extraction module 204 may determine as output a character embedding 402 indicative of vectors that capture the grammatical function (syntax) and the meaning (semantics) of the entity and position of each character recognized in "P . . . chased".

Figure 5A:
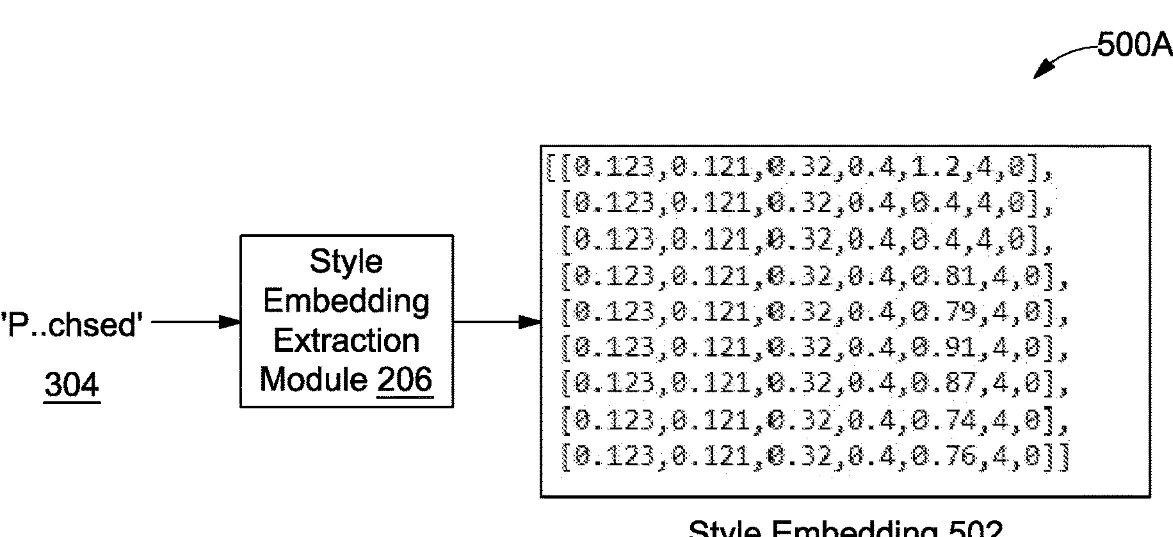
FIG. 5A illustrates a block diagram for extraction of exemplary style embedding, in accordance with an embodiment of the present disclosure.

Further, the style information extraction module 206 may determine a style embedding indicative of one or more text-characteristic information of each character recognized in the corresponding text entity. The text-characteristic information for each of the text entities may include font information of each character of each of the text entities. In an embodiment, the font information may include font type, font size, case information, and typography information (bold, italicized, underlined, etc.). Referring now to FIG. 5A, a block diagram for extraction of exemplary style embedding is illustrated, in accordance with an embodiment of the present disclosure. The block diagram 500A depicts the style embedding extraction module 206 receiving input as the output 304 of the OCR module 202. In an embodiment, the style embedding extraction module 206 may determine a vector matrix indicative of one or more text-characteristic information of each character recognized in the corresponding text entity. Accordingly, the style embedding 502 outputted by the style embedding extraction module 206 may be indicative of one or more text-characteristic information of each character recognized in the corresponding text entity such as but not limited to font information etc. In an embodiment, the font information may include font type, font size, case information, and typography information (bold, italicized, underlined, etc.).

Figure 5B:
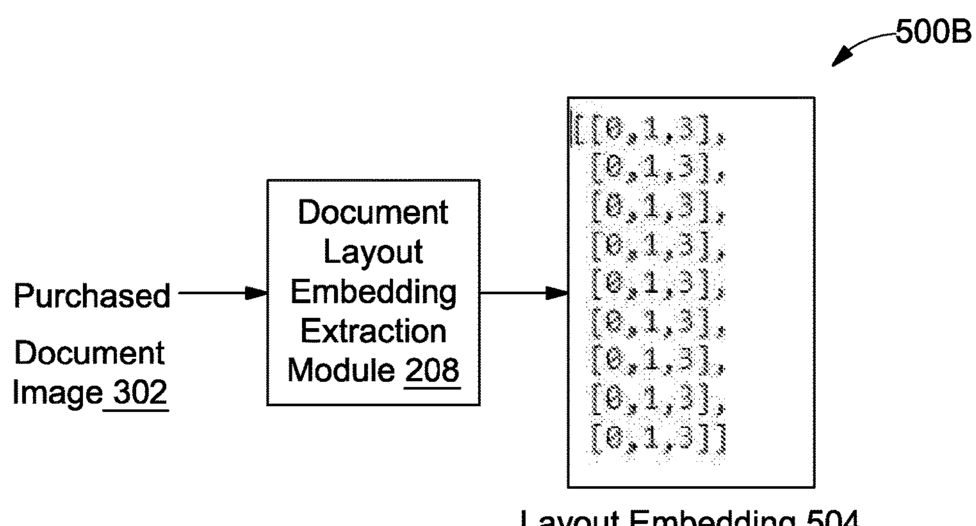
FIG. 5B illustrates a block diagram for extraction of exemplary layout embedding is illustrated, in accordance with an embodiment of the present disclosure.

Further, the document layout embedding extraction module 208 may determine a layout embedding of each of the one or more text entities indicative of a layout hierarchy information of each of the one or more text entities in the at least one document image. In an embodiment, the layout hierarchy information may include a plurality of hierarchy classifications such as, but not limited to, a table, a header, a sub-header, a paragraph, a graphical representation, etc. In order to determine the layout hierarchy information, the document layout embedding extraction module 208 may first determine one or more region of interest based on detection of various boundary lines or object detection techniques. FIG. 5B illustrates a block diagram 500B for extraction of exemplary layout embedding is illustrated, in accordance with an embodiment of the present disclosure. The document layout embedding extraction module 208 receives input image 302 in which one or more region of interest (ROI) may have been recognized using one or more ROI determination techniques. In an embodiment, the ROI recognized may be indicative of a layout hierarchy information of each of the one or more text entities in the document image 302. In an embodiment, the layout hierarchy information may include one or more of a plurality of hierarchy classifications such as, but not limited to, a table, a header, a sub-header, a paragraph, and a graphical representation, etc. Accordingly, the layout information may depict if a text entity forms header, sub-header, body text, graphical representation, etc. in the layout of the document.

Further, the concatenation module 210 may determine a concatenated embedding of each of the one or more text entities based on the corresponding character embedding, the style embedding and the document layout embedding of each of the one or more text entities. The concatenated embedding of each of the one or more text entities may be determined by concatenating the corresponding character embedding, the style embedding, and the document layout embedding, respectively. Further, the encoder-decoder DL model 212 may determine the corrected embedding of each text entity based on its corresponding concatenated embedding. The encoder-decoder DL model 212 may be trained to recognize data corresponding to at least one domain such as chemistry, mathematics, finance, etc. Accordingly, the OCR text 304 output by the OCR module 202 is corrected by the encoder-decoder DL model 212 based on the concatenated embedding 602. The data corresponding to at least one domain may be recognized by using domain dictionary 214 which may include data corresponding to one or more domains.

Figure 6:
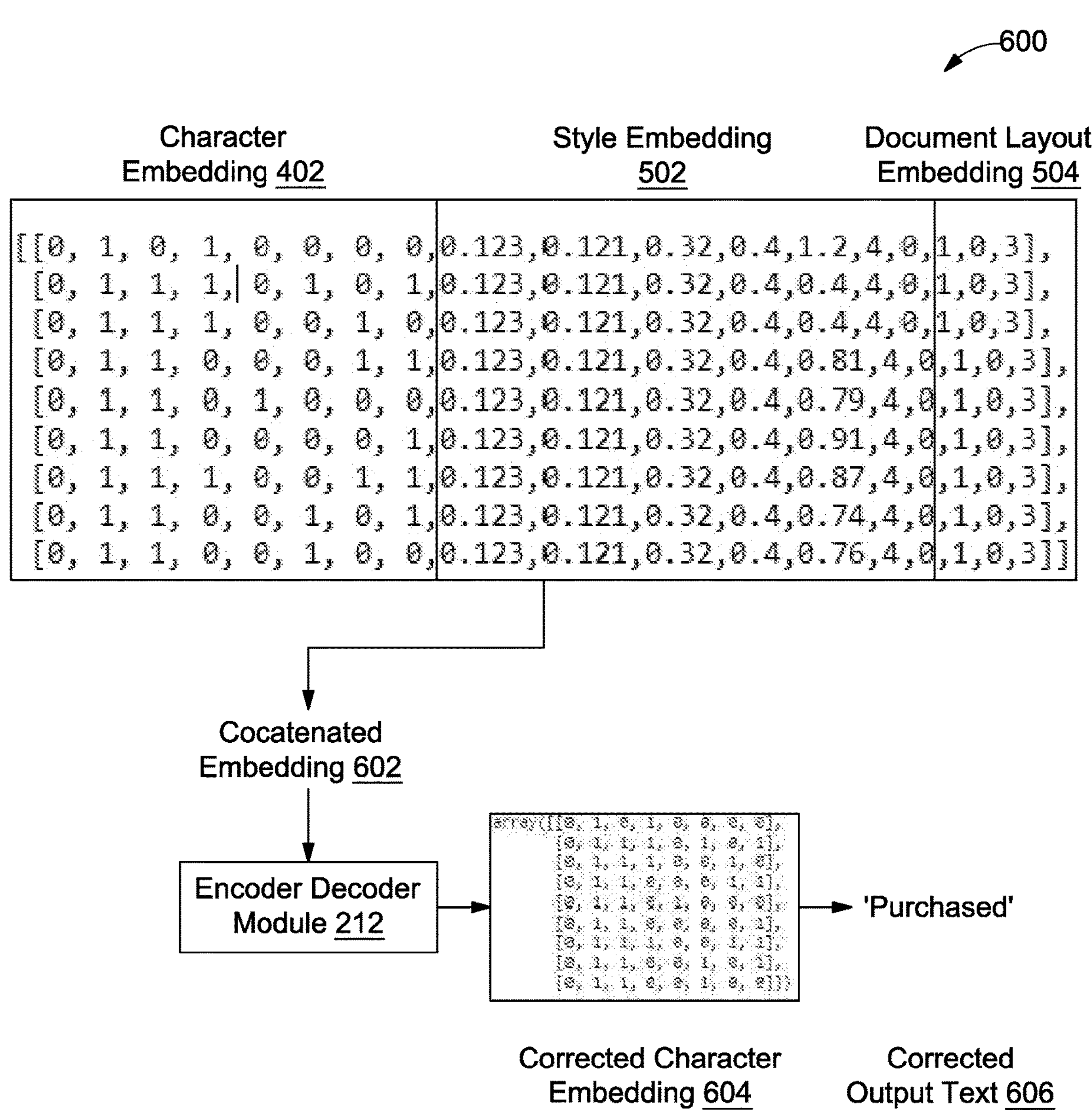
FIG. 6 illustrates a block diagram depicting domain-based OCR error correction based on exemplary concatenated embedding by the encoder-decoder DL module, in accordance with an embodiment of the present disclosure.

Referring now to FIG. 6, a block diagram 600 depicting domain-based OCR error correction based on exemplary concatenated embedding by the encoder-decoder DL module 212, in accordance with an embodiment of the present disclosure. The encoder decoder DL module 212 may receive as input a concatenated embedding 602 of a text entity. The concatenated embedding 602 may be generated by concatenating the character embedding 402, the style embedding 502 and the document layout embedding 504 as show by the concatenation module 210. The encoder-decoder DL module 212 may determine a corrected character embedding 604 based on the concatenated embedding 602 to output correct text "Purchased", which are incorrectly recognized as "P . . . chsed" by the OCR module 202. In an embodiment, the encoder-decoder DL module 212 may be trained to determine various domain-based characters based on training data including text entities related to one or more technical domains. Accordingly, the OCR text 304 output by the OCR module 202 is corrected by the encoder-decoder DL model 212 based on the concatenated embedding 602 to output corrected output text 606. Accordingly, the domain-based OCR error correction device 102 may determine correct domain-based text accurately than conventional OCR techniques.

Referring now to FIG. 7, an exemplary screenshot 700 depicting exemplary output results obtained from the domain-based OCR error correction device 102, in accordance with an embodiment of the present disclosure. The screenshot 700 depicts a plurality of outputs 702*a*, 704*a*, 706*a*, 708*a*, 710*a*, 712*a*, 714*a*, 716*a*, 718*a*, 720*a*, 722*a* generated by OCR module 202. Further, outputs 702*b*, 704*b*, 706*b*, 708*b*, 710*b*, 712*b*, 714*b*, 716*b*, 718*b*, 720*b*, 722*b* are obtained from the domain-based OCR error correction device 102 for the respective plurality of outputs generated by the OCR module 202. As can be seen, the outputs 702*b*, 704*b*, 706*b*, 708*b*, 710*b*, 712*b*, 714*b*, 716*b*, 718*b*, 720*b*, 722*b* provide corrected text when compared to the output of the OCR module 202.

Figure 8:
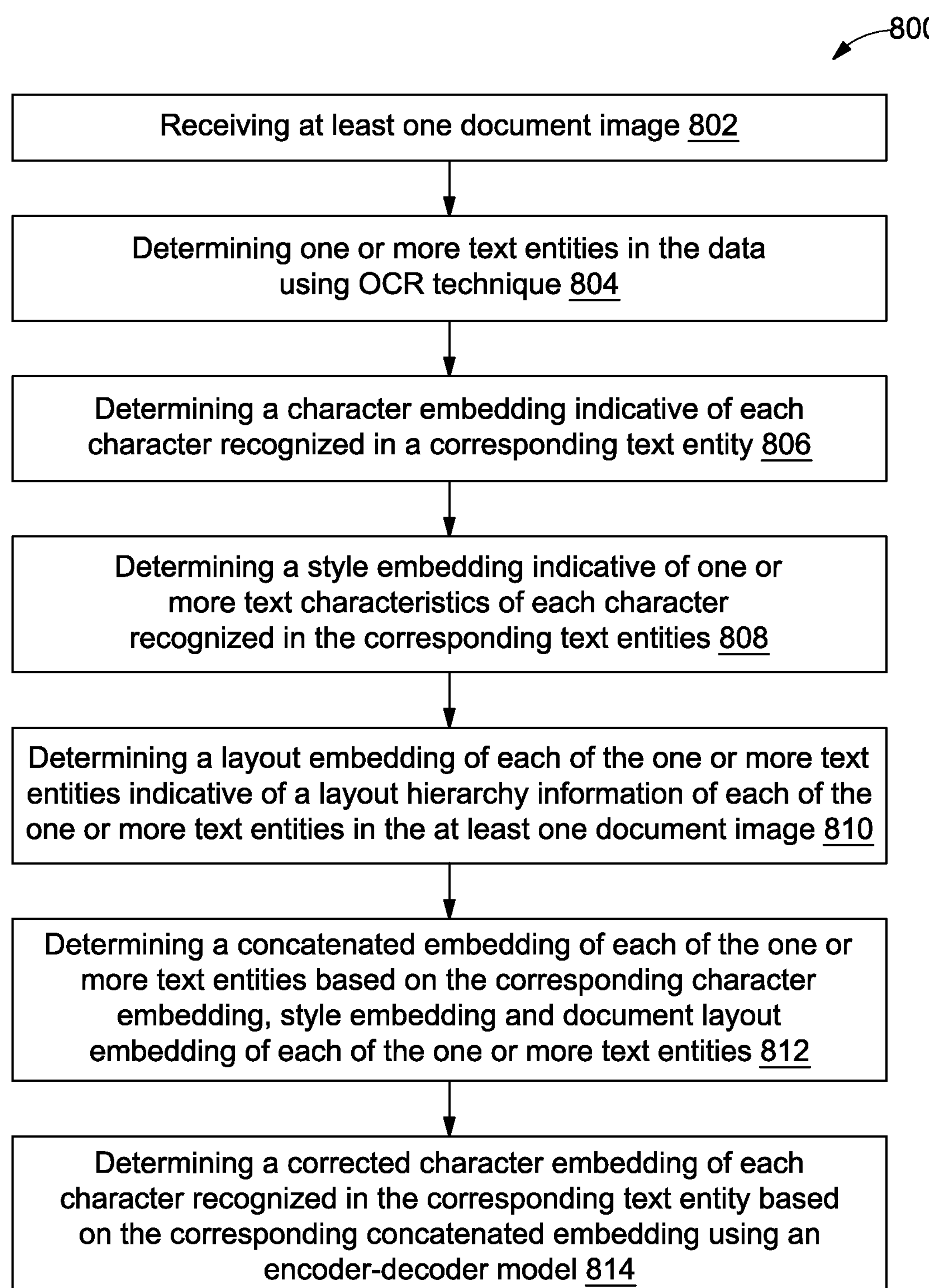
FIG. 8 is a flowchart of a method performing domain-based OCR error correction, in accordance with some embodiments of the present disclosure.

Referring now to FIG. 8, a flowchart 800 of a method performing domain-based OCR error correction, in accordance with some embodiments of the present disclosure. In an embodiment, the flowchart 800 may include a plurality of steps that may be performed by the processor 104 to perform domain-based optical character recognition.

At step 802, the processor 104 may receive at least one document image. In an embodiment, the at least one document image may include data corresponding to at least one domain. Further at step 804, the processor 104 may determine one or more text entities in the data using an optical character recognition (OCR) technique. In an embodiment, the one or more text entities may be determined based on recognition of each character of each of the one or more text entities.

Further at step 806, the processor 104 may determine a character embedding indicative of each character recognized in a corresponding text entity. Further at step 808, the processor 104 may determine a style embedding indicative of one or more text-characteristic information of each character recognized in the corresponding text entity. In an embodiment, the text-characteristic information for each of the text entities may include font information of each character of each of the text entities. In an embodiment, the font information may include, but not limited to, font type, font size, case information, and typography information, etc.

Further at step 810, the processor 104 may determine a layout embedding of each of the one or more text entities indicative of a layout hierarchy information of each of the one or more text entities in the document image. In an embodiment, the layout hierarchy information may include a plurality of hierarchy classifications such as, but not limited to, a table, a header, a sub-header, a paragraph, a graphical representation, etc.

Further at step 812, the processor 104 may determine a concatenated embedding of each of the one or more text entities based on the corresponding character embedding, style embedding, and document layout embedding of each of the one or more text entities. In an embodiment, the concatenated embedding of each of the one or more text entities may be determined by concatenating the corresponding character embedding, style embedding, and document layout embedding, respectively.

Further at step 814, the processor 104 may determine a corrected character embedding of each character recognized in the corresponding text entity based on the corresponding concatenated embedding using an encoder-decoder model. In an embodiment the font information comprises font type, font size, case information, and typography information.

It is intended that the disclosure and examples be considered as exemplary only, with a true scope of disclosed embodiments being indicated by the following claims.

What is claimed is:

1. A method of performing domain-based optical character recognition (OCR) error correction, the method comprising:

receiving, by a processor, at least one document image,
  wherein the at least one document image comprises data corresponding to at least one domain;

determining, by the processor, one or more text entities in the data using an Optical Character Recognition (OCR) technique,
  wherein the one or more text entities are determined based on recognition of each character of each of the one or more text entities;

for each of the one or more text entities:
  determining, by the processor, a character embedding indicative of each character recognized in a corresponding text entity;
  determining, by the processor, a style embedding indicative of one or more text-characteristic information of each character recognized in the corresponding text entity;

determining, by the processor, a layout embedding of each of the one or more text entities indicative of a layout hierarchy information of each of the one or more text entities in the at least one document image;

determining, by the processor, a concatenated embedding of each of the one or more text entities based on the corresponding character embedding, the style embedding and the document layout embedding of each of the one or more text entities; and for each of the one or more text entities:
  determining, by the processor, a corrected character embedding of each character recognized in the corresponding text entity based on the corresponding concatenated embedding using an encoder-decoder model, wherein the encoder-decoder model is trained to recognize data corresponding to the at least one domain.

2. The method of claim 1, wherein the text-characteristic information for each of the text entities comprises font information of each character of each of the text entities, wherein the font information comprises a font type, a font size, case information, and typography information.

3. The method of claim 1, wherein the layout hierarchy information comprises a plurality of hierarchy classifications comprising a table, a header, a sub-header, a paragraph, a graphical representation, etc.

4. The method of claim 1, wherein the concatenated embedding of each of the one or more text entities is determined by concatenating the corresponding character embedding, the style embedding, and the document layout embedding, respectively.

5. A system of performing domain-based optical character recognition (OCR) error correction, the system comprising:

a processor; and a memory communicably coupled to the processor, wherein the memory stores processor-executable instructions, which, on execution by the processor, cause the processor to:

receive at least one document image, wherein the at least one document image comprises data corresponding to at least one domain;

determine one or more text entities in the data using an Optical Character Recognition (OCR) technique, wherein the one or more text entities are determined based on recognition of each character of each of the one or more text entities;

for each of the one or more text entities:

determine a character embedding indicative of each character recognized in a corresponding text entity;

determine a style embedding indicative of one or more text-characteristic information of each character recognized in the corresponding text entity;

determine a layout embedding of each of the one or more text entities indicative of a layout hierarchy information of each of the one or more text entities in the at least one document image;

determine a concatenated embedding of each of the one or more text entities based on the corresponding character embedding, style embedding and document layout embedding of each of the one or more text entities; and for each of the one or more text entities:

determine a corrected character embedding of each character recognized in the corresponding text entity based on the corresponding concatenated embedding using an encoder-decoder model, wherein the encoder-decoder model is trained to recognize data corresponding to the at least one domain.

6. The system of claim 5, wherein the text-characteristic information for each of the text entities comprises font information of each character of each of the text entities, wherein the font information comprises a font type, a font size, case information, and typography information.

7. The system of claim 5, wherein the layout hierarchy information comprises a plurality of hierarchy classifications comprising a table, a header, a sub-header, a paragraph, a graphical representation, etc.

8. The system of claim 5, wherein the concatenated embedding of each of the one or more text entities is determined by concatenating the corresponding character embedding, the style embedding, and the document layout embedding, respectively.

9. A non-transitory computer-readable medium storing computer-executable instructions for performing domain-based optical character recognition (OCR) error correction, the computer-executable instructions configured for:

receiving at least one document image, wherein the at least one document image comprises data corresponding to at least one domain;

determining one or more text entities in the data using an Optical Character Recognition (OCR) technique, wherein the one or more text entities are determined based on recognition of each character of each of the one or more text entities;

for each of the one or more text entities:

determining a character embedding indicative of each character recognized in a corresponding text entity;

determining a style embedding indicative of one or more text-characteristic information of each character recognized in the corresponding text entity;

determining a layout embedding of each of the one or more text entities indicative of a layout hierarchy information of each of the one or more text entities in the at least one document image;

determining a concatenated embedding of each of the one or more text entities based on the corresponding character embedding, the style embedding and the document layout embedding of each of the one or more text entities; and for each of the one or more text entities:

determining a corrected character embedding of each character recognized in the corresponding text entity based on the corresponding concatenated embedding using an encoder-decoder model, wherein the encoder-decoder model is trained to recognize data corresponding to the at least one domain.

10. The non-transitory computer-readable medium of claim 9, wherein the text-characteristic information for each of the text entities comprises font information of each character of each of the text entities, and wherein the font information comprises a font type, a font size, case information, and typography information.

11. The non-transitory computer-readable medium of claim 9, wherein the layout hierarchy information comprises a plurality of hierarchy classifications comprising a table, a header, a sub-header, a paragraph, a graphical representation, etc.

12. The non-transitory computer-readable medium of claim 9, wherein the concatenated embedding of each of the one or more text entities is determined by concatenating the corresponding character embedding, the style embedding, and the document layout embedding, respectively.

* * * * *